United States Patent
Katti et al.

(10) Patent No.: US 12,260,760 B2
(45) Date of Patent: Mar. 25, 2025

(54) REMOTE SENSOR ACCESS

(71) Applicant: Ford Global Technologies, LLC, Dearborn, MI (US)

(72) Inventors: Bhagyashri Satyabodha Katti, Novi, MI (US); Nithya Somanath, Farmington Hills, MI (US); Kwaku O. Prakah-Asante, Commerce Township, MI (US); Harald Christian Martinez, Northville, MI (US); Ayush Shah, Dearborn, MI (US); Joseph Wisniewski, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 18/054,563

(22) Filed: Nov. 11, 2022

(65) Prior Publication Data
US 2024/0161618 A1    May 16, 2024

(51) Int. Cl.
*G08G 1/14* (2006.01)
*H04W 4/40* (2018.01)

(52) U.S. Cl.
CPC ............. *G08G 1/144* (2013.01); *H04W 4/40* (2018.02)

(58) Field of Classification Search
CPC ........... G08G 1/144; H04W 4/40; H04W 4/44
USPC .......................................................... 701/2
See application file for complete search history.

(56) References Cited

U.S. PATENT DOCUMENTS

| | | | |
|---|---|---|---|
| 5,781,119 A | 7/1998 | Yamashita et al. |
| 6,032,097 A | 2/2000 | Iihoshi et al. |
| 6,356,820 B1 | 3/2002 | Hashimoto et al. |
| 6,580,976 B1 | 6/2003 | Belcea |
| 7,831,345 B2 | 11/2010 | Heino et al. |
| 8,352,111 B2 | 1/2013 | Mudalige |
| 8,620,517 B2 | 12/2013 | Caveney et al. |
| 8,775,060 B2 | 7/2014 | Solyom et al. |
| 8,989,995 B2 | 3/2015 | Shida |
| 9,165,470 B2 | 10/2015 | Mudalige et al. |
| 9,396,661 B2 | 7/2016 | Okamoto |
| 9,494,944 B2 | 11/2016 | Alam et al. |
| 9,520,064 B2 | 12/2016 | Tsuda |
| 9,632,507 B1 | 4/2017 | Korn |
| 9,721,474 B2 | 8/2017 | Eskilson |
| 2002/0059017 A1 | 5/2002 | Yamane et al. |
| 2008/0014908 A1 | 1/2008 | Vasant |
| 2010/0049374 A1 | 2/2010 | Ferrin et al. |
| 2010/0256836 A1 | 10/2010 | Mudalige |

(Continued)

FOREIGN PATENT DOCUMENTS

JP    2019508764 A    3/2019
KR   20180050072 A    5/2018

*Primary Examiner* — Tyler D Paige
(74) *Attorney, Agent, or Firm* — Frank Lollo; Brooks Kushman P.C.

(57) ABSTRACT

A system for accessing vehicle sensor data. The system includes receiving vehicle sensor data and a vehicle location associated with the vehicle sensor data from a publisher vehicle. A subscriber request for remote data is received from a service subscriber. The subscriber request includes a request location. A match condition is determined. The match condition includes a vehicle location match between the request location and the vehicle location. The vehicle sensor data is transmitted to the service subscriber upon the occurrence of the match condition.

20 Claims, 5 Drawing Sheets

(56) References Cited

U.S. PATENT DOCUMENTS

| | | |
|---|---|---|
| 2011/0261202 A1* | 10/2011 | Goldstein ........ G08B 13/19602 |
| | | 340/541 |
| 2014/0118167 A1 | 5/2014 | Im et al. |
| 2014/0246257 A1 | 9/2014 | Jacobsen et al. |
| 2015/0151742 A1 | 6/2015 | Clarke et al. |
| 2015/0153733 A1 | 6/2015 | Omhura et al. |
| 2015/0269845 A1 | 9/2015 | Calmettes et al. |
| 2015/0294431 A1* | 10/2015 | Fiorucci ................ G07B 15/02 |
| | | 705/13 |
| 2016/0027307 A1 | 1/2016 | Abhyanker et al. |
| 2016/0171894 A1 | 6/2016 | Harvey |
| 2017/0200197 A1 | 7/2017 | Brubaker |
| 2019/0349794 A1 | 11/2019 | Tavares Coutinho et al. |
| 2019/0378150 A1 | 12/2019 | Patsiokas et al. |
| 2020/0013288 A1 | 1/2020 | Stefik et al. |
| 2020/0202716 A1* | 6/2020 | Edwards .......... G08G 1/096855 |
| 2020/0349666 A1 | 11/2020 | Hodge et al. |
| 2020/0401157 A1* | 12/2020 | Johnston .............. G05D 1/0285 |
| 2022/0036405 A1 | 2/2022 | Publicover et al. |
| 2022/0131201 A1 | 4/2022 | Morin et al. |
| 2024/0161618 A1* | 5/2024 | Katti ...................... G08G 1/144 |

* cited by examiner

REMOTE SENSOR ACCESS

BACKGROUND

Autonomous and semi-autonomous driving technologies typically compute road conditions based on sensor data. Sensor data may be generated by various onboard vehicle sensors, such as video cameras, ultrasonic sensors, radar, and light detection and ranging (LIDAR) sensors.

DETAILED DESCRIPTION

The present disclosure describes systems and methods for remotely accessing vehicle sensors, such as exterior vehicle cameras. For example, a service subscriber may request access to available parking spots in a particular area. Publishing vehicles that agree to share vehicle sensor data may transmit indications of available parking spots based on their vehicle sensor data and location. In another scenario, a service subscriber may have parked their vehicle in an isolated location. Before walking to their vehicle, the subscriber may request access to camera images from publisher vehicles parked next to or in the vicinity of the subscriber's vehicle to monitor the environment near the subscriber's vehicle.

Throughout the description reference is made to FIGS. 1-5. When referring to the figures, like structures and elements shown throughout are indicated with like reference numerals.

In one exemplary configuration, a system for accessing vehicle sensor data is disclosed. The system includes a server with a server processor and a server memory. The server memory stores server instructions executable by the server processor to receive the vehicle sensor data and a vehicle location associated with the vehicle sensor data from a publisher vehicle. Another receiving instruction causes the server processor to receive, from a service subscriber, a subscriber request for remote data. The subscriber request includes a request location. A determining instruction determines whether there is a match condition. The match condition may include a vehicle location match between the request location and the vehicle location. A transmitting instruction causes transmission of the vehicle sensor data to the service subscriber upon the occurrence of the match condition.

In one configuration, the vehicle sensor data includes camera images of a physical area adjacent the publisher location. The vehicle sensor data may include an indication of an available parking location adjacent the publisher vehicle. The vehicle sensor data may include a published data time and the subscriber request may include a request time period. The match condition may include a time match between the request time period and the published data time.

In one implementation, the vehicle sensor data includes a publisher data type and the subscriber request includes a subscriber data type. The condition may include a type match between the publisher data type and the subscriber data type. The server instructions can include server instructions to receive an indication of an allowed region for the vehicle sensor data and the match condition may include a region match between the vehicle location and the allowed region. Similarly, the vehicle sensor data may include a published data time and the server instructions may include server instructions to receive an indication of an allowed time for the vehicle sensor data. The match condition may include a time match between the allowed time and the published data time.

The server instructions may include instructions to train a machine learning model to determine recommended data sources based on historical subscriber requests from the service subscriber. In another configuration, the server instructions include server instructions to train a machine learning model to determine recommended data sources based on historical subscriber requests from a plurality of service subscribers. The plurality of subscribers can include subscribers in a particular geographical region (such as downtown Chicago), time (such as 11 PM to 12 PM), and/or other selection basis. The instructions may include instructions to provide the recommended data sources to the service subscriber.

The server instructions may include server instructions to receive stationary sensor data associated with a stationary location and to transmit the stationary sensor data to the service subscriber upon the occurrence of the match condition. The match condition may include stationary location match between the request location and the stationary location.

The system may include a subscriber device including a device processor and device memory. The device memory may include device instructions executable by the device processor to send the subscriber request for the remote data to the server and receive the vehicle sensor data from the server. The subscriber device may be, for example, a smartphone, a computer carried by a subscriber vehicle, or any internet enabled smart device. The device instructions may include instructions to display the vehicle sensor data on a vehicle display at the subscriber vehicle.

Another exemplary configuration is a method for accessing remote sensor data. The method may include steps of receiving vehicle sensor data and a vehicle location associated with the vehicle sensor data from a publisher vehicle, receiving, from a service subscriber, a subscriber request for remote data, the subscriber request including a request location, determining whether there is a match condition, and transmitting the vehicle sensor data to the service subscriber upon the occurrence of the match condition. The match condition may include a vehicle location match between the request location and the vehicle location.

The vehicle sensor data may include camera images of a physical area adjacent the publisher location. The vehicle sensor data may include an indication of an available parking location adjacent the publisher vehicle. In one configuration, the vehicle sensor data includes a published data time and the subscriber request includes a request time period. The match condition may include a time match between the request time period and the published data time.

The method may include receiving an indication of an allowed region for the vehicle sensor data. The match condition may include a region match between the vehicle location and the allowed region.

Yet another implementation may include a computer program product for accessing vehicle sensor data. The computer program product includes computer readable program code configured to receive the vehicle sensor data and a vehicle location associated with the vehicle sensor data from a publisher vehicle, to receive, from a service subscriber, a subscriber request for remote data, the subscriber request including a request location, to determine whether there is a match condition, and to transmit the vehicle sensor data to the service subscriber upon the occurrence of the match condition. The match condition may include a vehicle location match between the request location and the vehicle location.

Figure 1:
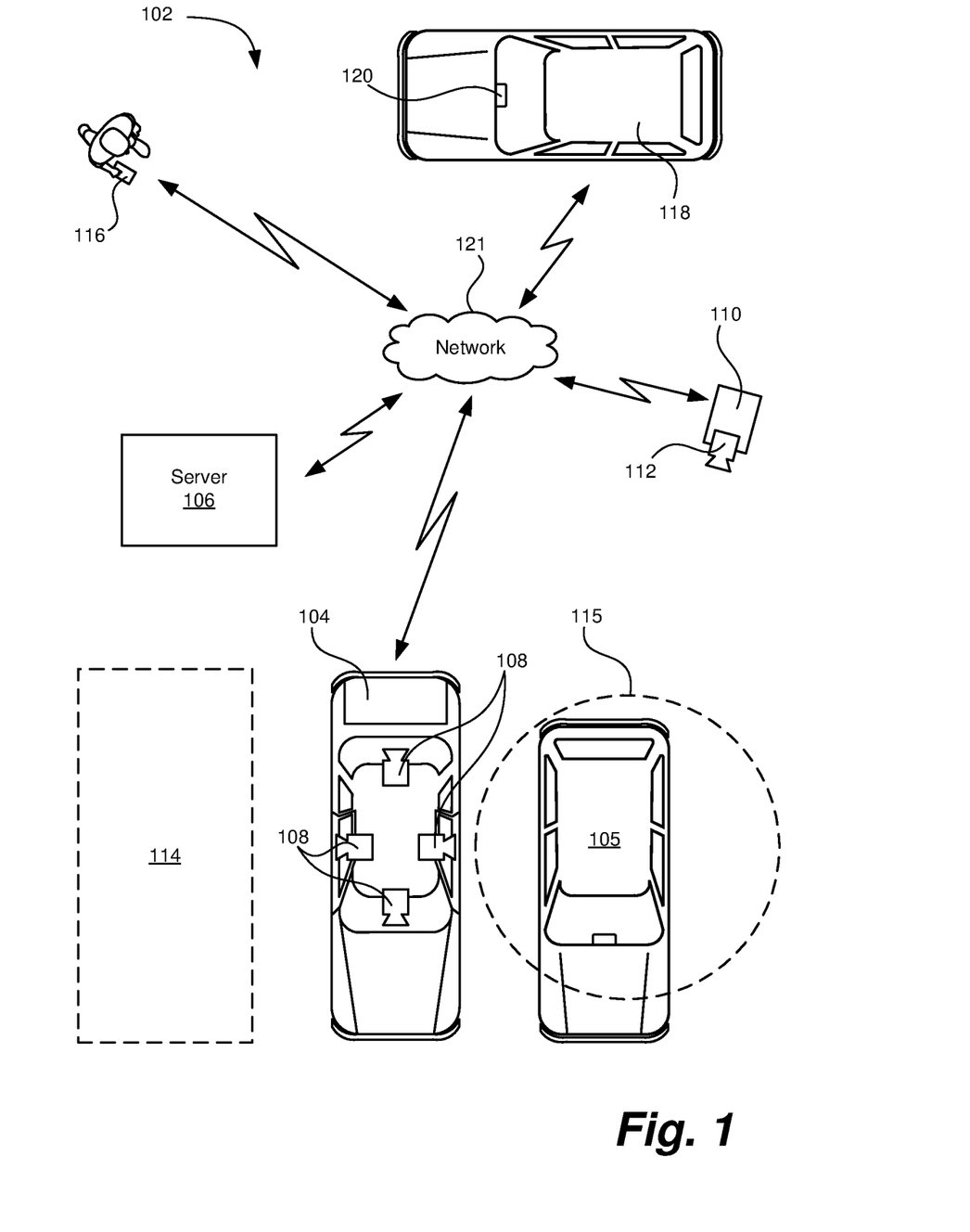
FIG. 1 shows an example system for accessing remote sensor data from a server.

FIG. 1 shows an example system 102 for remotely accessing vehicle sensors. The system 102 includes a publisher vehicle 104 in communication with a server 106 via a communication network 121. The publisher vehicle 104 includes a plurality of vehicle sensors 108, such as exterior facing cameras, LIDAR sensors, ultrasonic sensors, radar sensors, proximity sensors, and location sensors. Thus, the publisher vehicle 104 can generate vehicle sensor data and can associate the vehicle's location with the vehicle sensor data.

The vehicle sensor data may include camera images of a physical area 115 adjacent the publisher vehicle's location. As used herein, adjacent means within a sensor's field of view. For example, the vehicle sensor data may include an indication of an available parking location 114 adjacent the publisher vehicle 104. The vehicle sensor data may include a video image of a parked vehicle 105 adjacent the publisher vehicle 104.

The system 102 may also include a publisher station 110 in communication with the server 106 via the communication network 121. The publisher station 110 can be positioned at a stationary geographic location and may include one or more stationary sensors 112 that generate stationary sensor data associated with stationary location. For example, the publisher station 110 can be a computer mounted in a parking lot location with a camera as a stationary sensor 112.

The system 102 may further include a service subscriber 116 in communication with the server 106 via the communication network 121. The service subscriber 116 may be, for example, a portable computing device, such as a smartphone, a smart display, or a portable computer. In one configuration, the portable computing device is a computer on a subscriber vehicle 118. The subscriber vehicle 118 may include one or more vehicle displays 120. The subscriber vehicle 118 can include a plurality of vehicle sensors, such as, but not limited to, exterior facing cameras, LIDAR sensors, ultrasonic sensors, radar sensors, proximity sensors, audio sensors, and location sensors.

The server 106, the service subscriber 116, publisher vehicle 104, publisher station 110, and subscriber vehicle 118 can be programmed to communicate with one or more remote sites, such as the server 106, via the communication network 121. The network 121 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks using, for example, Bluetooth®, Bluetooth® Low Energy (BLE), IEEE 802.11, vehicle-to-vehicle (V2V), such as Dedicated Short Range Communications (DSRC), local area networks (LAN) and/or wide area networks (WAN), including the Internet, to provide data communication services.

Figure 2:
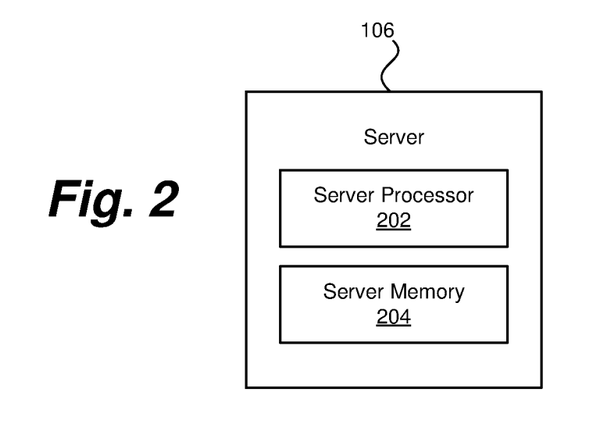
FIG. 2 shows an example configuration of the server.

FIG. 2 shows an example configuration of the server 106. The server 106 may be a general-purpose server or a special-purpose server, and may be a virtual server or a cloud server. The server 106 includes a server processor 202 and a server memory 204. The server processor 202 is configured to execute computer instructions stored in the server memory 204. The server processor 202 can be multiple computer processors coupled together. Various types of memory technologies may be utilized in the server memory 204, such as random access memory (RAM), read only memory (ROM), and Flash memory.

The server memory 204 may include instructions to cause the server processor 202 to receive vehicle sensor data and a vehicle location associated with the vehicle sensor data from the publisher vehicle 104. The server 106 may also receive stationary sensor data from the publisher station 110. The server 106 may receive additional meta data about the sensor data, such as a timestamp or a published data time, i.e., a time at which the sensor reports having detected and/or the server 106 reports having transmitted the data. The meta data may include a publisher data type that indicates, for example, the type of data transmitted by the publisher to the server and a publisher type that indicates, for example, whether the publisher is a publisher vehicle 104 or a publisher station 110. Herein, when referring to sensor data, a data type means a type of sensor or sensing medium (e.g., video data, LIDAR data, etc.); a publisher type refers to a category to which a publisher belongs and typically includes at least a vehicle and station publisher type.

The server 106 may process sensor data to generate additional data types. For example, the server 106 may use sensors and weather data to alert a service subscriber 116 to an amount of snow in the vicinity of his/her vehicle. In another example, the server 106 may perform image processing of vehicle and/or stationary cameras, combined with location mapping and LIDAR data, to provide available parking data indicating whether a parking spot 114 is available. In this document, a "location" means a physical location on the surface of the earth, and can be specified according to some coordinate system, such as according to geo-coordinates used in a global coordinate system, e.g., by the Global Positioning System (GPS) or some other system using the Global navigation satellite system (GNSS).

The server 106 may receive an indication of an allowed region for the vehicle sensor data. That is, the publisher vehicle 104 may specify one or more locations where access to the vehicle sensor data is permitted or denied. For example, the publisher vehicle 104 may permit access to the vehicle sensor data on public streets but may deny access to the vehicle sensor data while on private roads and driveways. An allowed region in the present context is an area defined by a set of locations (e.g., according to a geo-fence or the like) where access to the vehicle sensor data is permitted.

The server 106 may further receive an indication of an allowed time for the vehicle sensor data. The allowed time specifies when access to the vehicle sensor data is allowed or denied. For example, the publisher vehicle 104 or the publisher station 110 may permit access to the vehicle sensor data during certain specified times of the day or certain specified days of week, and can deny access to sensor data at other specified times.

The server memory 204 may include instructions to cause the server processor 202 to receive a subscriber request from the service subscriber 116. The subscriber request may include a request for remote data from a particular request location. The subscriber request may contain a request time period and a request data type.

For example, a subscriber in a subscriber vehicle 118 may be interested in locating an available parking location 114 every morning before work. The subscriber may issue a subscriber request for available parking data (request data type) at a particular area (request location) in real time from 8:15 AM to 8:45 AM on work days (request time).

In another example, a subscriber may want to monitor the physical area 115 around their parked vehicle 105 upon walking from an office building to the parked vehicle 105. The subscriber may issue a subscriber request for video data (request data type) at a parking area (request location) in real time (request time) to be displayed on the service subscriber 116.

The instructions stored in server memory 204 may cause the server processor 202 to determine whether there is a match condition between the subscriber request and available sensor data. The match condition can include a vehicle location match between the request location in the subscriber request and the vehicle location associated with the vehicle sensor data and/or the location associated with the stationary sensor data. The match condition may include a time match between the request timer period and the published data time of the vehicle sensor data. The match condition may include a type match between the publisher data type and the subscriber data type.

As discussed above, the publisher may prefer to limit access to the vehicle sensor data. The match condition may include a region match between the vehicle location and the allowed region associated with the vehicle sensor data. In this context, a region match means that the vehicle location overlaps an allowed region defined by a set of locations (e.g., according to a geo-fence or the like) where access to the vehicle sensor data is permitted. The match condition may include a time match between the allowed time period and the published data time associated with the sensor data. As used herein, a time match means the published data time falls within the allowed time period.

Once a match condition is found, the instructions may cause the server processor 202 to transmit the vehicle sensor data and/or stationary sensor data to the service subscriber. The server 106 can transmit and receive information, including sensor data and subscriber requests, via wired and wireless communication technologies. For example, the server 106 may communicate with the publisher vehicle 104 and/or the service subscriber through the communication network 121.

The server memory 204 may also include instructions to cause the server processor 202 to provide a financial incentive for transmission of vehicle sensor data by the publisher vehicle 104. For example, the publisher vehicle 104 may be given access to sensor data from other publishers in return for access to its sensor data. The server 106 may provide payment to the publisher vehicle 104 based on the number of subscribers to the sensor data. Thus, payment to the publisher vehicle 104 may increase based on the popularity of the vehicle's or station's sensor data.

In one configuration, the server 106 can include algorithms that can learn from data, including artificial intelligence (AI), getting computers to act without being explicitly programmed, automated reasoning, automated suggestion, automated adaptation, automated decision making, automated learning, or combination thereof. For example, the server 106 may utilize a machine learning model to automatically suggest to a service subscriber 116 a subscription to a data feed from a publisher vehicle 104 and/or a publisher station 110.

A machine learning model can provide machine learning including prediction, recommendation, filtering such as data source filtering, machine learning processes, machine learning functions, or a combination thereof. For example, a suitable machine learning (ML) program such as a deep neural network (DNN) may be trained and then used to output, filter and/or recommend data sources. A DNN can be a software program that can be loaded in memory and executed by a processor included in a computer, such as a server 106, and/or the service subscriber 116, for example. In an example implementation, the DNN can include, but is not limited to, a convolutional neural network CNN, R-CNN Region-based CNN, Fast R-CNN, and Faster R-CNN. The DNN includes multiple nodes or neurons. The neurons are arranged so that the DNN includes an input layer, one or more hidden layers, and an output layer. The input and output layers may also include more than one node.

As one example, the DNN can be trained with ground truth data, i.e., data about a real-world condition or state. For example, the DNN can be trained with ground truth data and/or updated with additional data. Weights can be initialized by using a Gaussian distribution, for example, and a bias for each node can be set to zero. Training the DNN can include updating weights and biases via suitable techniques such as back-propagation with optimizations. Ground truth data means data deemed to represent a real-world environment, e.g., conditions and/or objects in the environment. Thus, ground truth data can include sensor data depicting an environment, e.g., a speed, location, etc., along with a label or labels describing the environment, e.g., a label describing the data, e.g., an available parking location, a prior user(s) subscriptions, etc.

In the present context, ground truth data used to train a DNN could include, for example, available parking locations, prior user subscriptions, day/time blocks, locations, and/or weather conditions. Then, the DNN could be included in the server 106 and/or a vehicle computer to output a prediction or recommendation for a data subscription.

In some configurations, a prediction output from a DNN or the like can recommend a data source or data sources, and can filter data sources. The server memory 204 may include instructions to train a machine learning model to determine recommended data sources based on historical subscriber requests from the service subscriber 116. The server memory 204 may include instructions to train a machine learning model to determine recommended data sources based on historical subscriber requests from a plurality of other service subscribers. Additionally, the instructions may provide the recommended data sources to the service subscriber 116.

Figure 3:
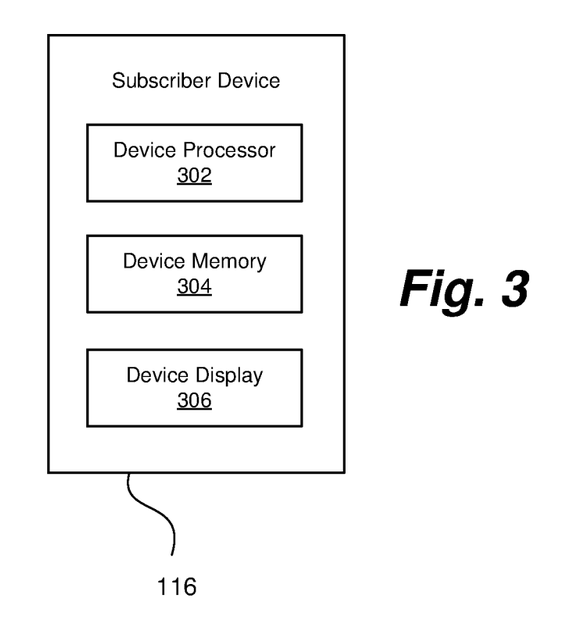
FIG. 3 shows an example configuration of a subscriber device.

FIG. 3 shows an example configuration of the service subscriber 116. The service subscriber 116 may include a device processor 302 and device memory 304. Depending on the exact configuration and type of service subscriber 116, device memory 304 may be volatile, such as RAM, non-volatile, such as ROM and flash memory, or some combination of the two. Additionally, the service subscriber 116 may also have mass storage (removable and/or non-removable), such as a magnetic or optical disks or tape. Similarly, the service subscriber 116 may also have input devices, such as a keyboard and/or a mouse. The service subscriber 116 may include a display 306, such as a vehicle display 120, to output information. Other aspects of the service subscriber 116 may include network connections to other devices, computers, networks, servers, and the like using either wired or wireless media.

The device memory 304 may include device instructions executable by the device processor 302 to send the subscriber request for the remote data to the server 106. As discussed above, the subscriber request may include a request for remote data from a particular request location, and may contain a request time period and a request data type.

The device memory 304 may further include instructions executable by the device processor 302 to receive the vehicle sensor data from the server 106 and to display the vehicle sensor data on the device display 306. For example, the service subscriber 116 may a smartphone carried by someone walking to their parked vehicle 105 and the device display 306 shows a video image from a publisher vehicle 104 adjacent to the parked vehicle 105. In another example, the service subscriber 116 is a computer carried by a subscriber vehicle 118 and the device display 306 is the vehicle display 120 showing available parking spots 114 on a displayed driving map.

Figure 4A:
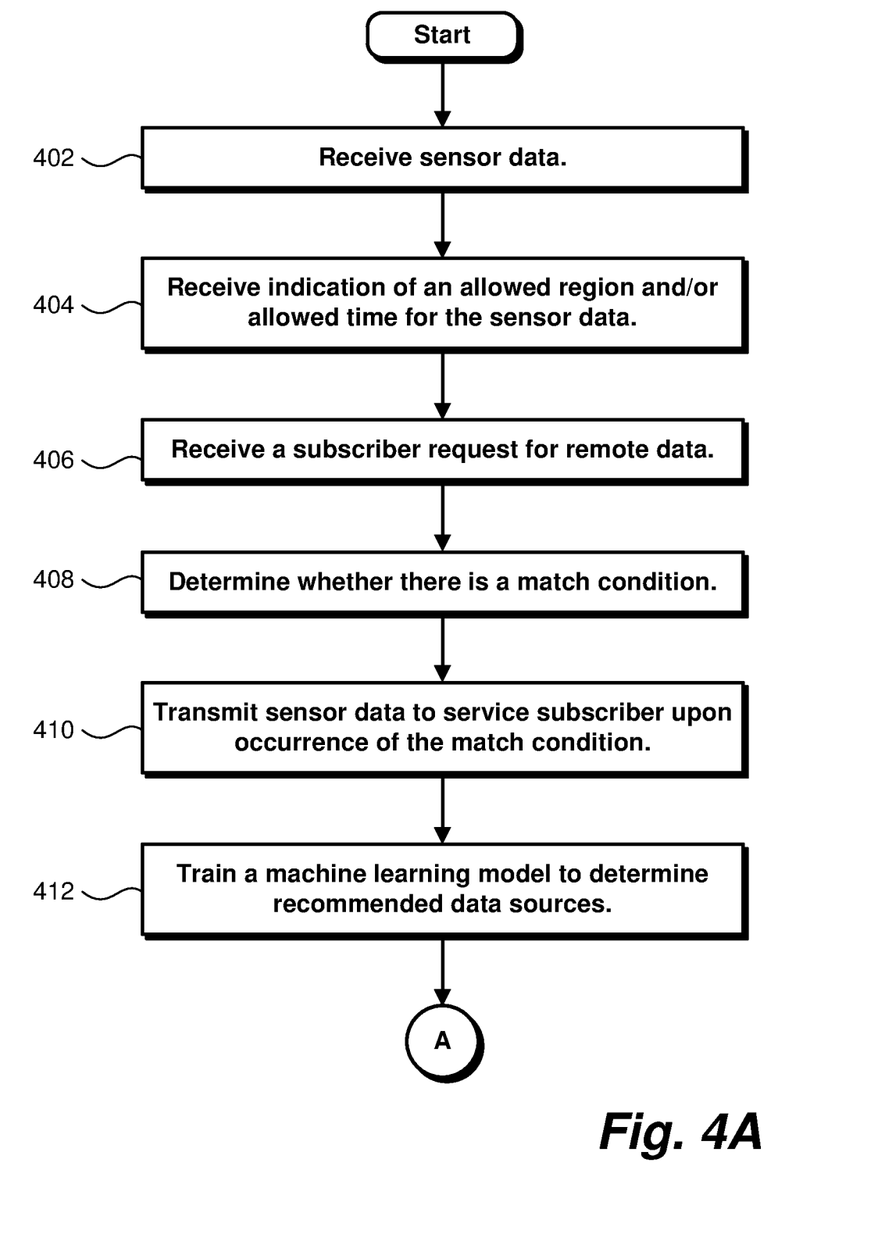
FIGS. 4A and 4B show an example method for sensor access performed by the server.
Figure 4B:
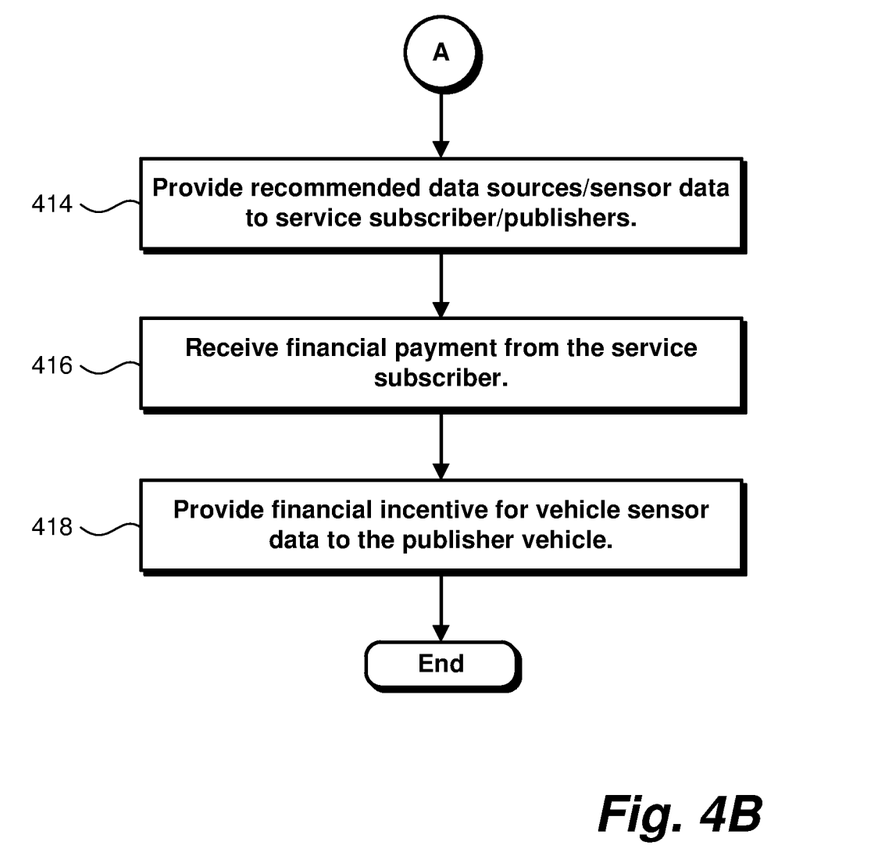

FIGS. 4A and 4B show an example method for sensor access performed by the server 106. The method includes receiving operation 402 to receive vehicle sensor data and a vehicle location associated with the vehicle sensor data by a server 106 from a publisher vehicle 104. The receiving operation 402 may include receiving stationary sensor data associated with a stationary location from a publisher station 110. It is contemplated that many sensor data publishers may communicate with the server 106 and create a pool of sensor data, with each publisher configuring their sensor data feeds to their preferences.

The sensor data may be generated from vehicle sensors 108 mounted at the publisher vehicle 104 and/or stationary sensors 112 at a publisher station 110. For example, the vehicle sensor data may be camera images of a physical area 115 adjacent a publisher vehicle 104 and/or a publisher station 110. Other sensors may be used by the method, such as LIDAR sensors and ultrasonic sensors. For example, LIDAR sensors may be used to indicate an available parking location 114 adjacent the publisher vehicle 104. It is contemplated that the sensor data may include other metadata, such as a published data time and a publisher data type. After receiving operation 402, control passes to receiving operation 404.

At receiving operation 404, the server 106 receives an indication of an allowed region and/or allowed time for the vehicle sensor data. In this manner, the publisher vehicle 104 can opt-in to share vehicle sensor data pursuant to their preferences. For example, publisher vehicle 104 can be configured by its user to share sensor data only at some locations and at only some days and/or times. The publisher vehicle 104 may opt to share certain data types, such as a live video feed from specific cameras and LIDAR sensor data but not audio sensor data. After receiving operation 404, control passes to receiving operation 406.

At receiving operation 406, the server 106 receives, from a service subscriber 116, a subscriber request for remote data. The subscriber request may include a request location, a request time period, and a subscriber data type. For example, a service subscriber 116 may operate a parked vehicle 105 that is not equipped with a video camera. The service subscriber may send a subscriber request to access video feeds from vehicle sensors 108 of publisher vehicles 104 located next to the parked vehicle 105. The video feed can be used to monitor the physical area 115 next to the parked vehicle 105. The service subscriber 116 may receive push notifications when the vehicle sensors 108 detect movement near the parked vehicle 105. In this way, the service subscriber 116 may benefit and experience remote sensor features without their vehicle being equipped with a video camera or other sensors that monitor the surrounding environment.

In another scenario, a service subscriber 116 may plan to visit a particular destination location, such as camping location. The service subscriber 116 may send a subscriber request for video feed to the server 106 of the camping location to evaluate the conditions of the camping location. The subscriber request may be tailored to a specific time of day the subscriber is planning to arrive at the camping location to determine, for instance, the lighting conditions or parking availability at the camping location.

In a different scenario, a subscriber may be driving in a subscriber vehicle 118 and looking for an available parking spot 114 in a particular area. The subscriber vehicle 118 may request sensor data of available parking spots near its location from the server 106 to save time searching for a place to park. After receiving operation 406, control passes to determining operation 408.

At determining operation 408, the server determines whether there is a match condition between the requested sensor data by service subscriber 116 and the available sensor data from the publisher vehicles 104 and/or publisher stations 110. A match condition between a first datum and a second datum is met when the respective data are the same, e.g., matching strings, matching numeric values, when the first datum falls within a value range of the second datum, etc. The match condition may include a vehicle location match between the request location and the vehicle location of a publisher vehicle 104. The match condition may include a stationary location match between the request location and the stationary location of a publisher station 110. The match condition may include a time match between the request time period and the published data time. The match condition may include a type match between the publisher data type and the subscriber data type.

As discussed above, the publisher vehicle 104 may opt-in to sharing its sensor data. The publisher's sensor data may be limited to a particular region and/or to a particular time. For example, the match conditions may include geofenced locations. Thus, the match condition may include a region match between the vehicle location and the allowed region. The match condition may include a time match between the allowed time and the published data time. After determining operation 408, control passes to transmitting operation 410.

At transmitting operation 410, the server 106 transmits the vehicle sensor data and/or stationary sensor data to the service subscriber 116 upon occurrence of the match condition. For example, when a publisher vehicle 104 is at location X and a subscribing vehicle 118 is planning to go to location X (or is on its way to location X) and enables push notifications for available parking spots 114 at location X, the server 106 may transmit notification of an available parking spot 114 based on the publisher vehicle's 104 sensor data if the publisher vehicle 104 has allowed sensor data sharing at location X, within the time frame of the requested data, and of the data type requested. After transmitting operation 410, control passes to training operation 412.

At training operation 412, the server 106 may train a machine learning model to determine recommended data sources. The machine learning model may be trained based on historical subscriber requests from the service subscriber 116. The machine learning model may alternatively or additionally be trained based on historical subscriber requests from a plurality of other service subscribers. For example, the machine learning model may use collaborative filtering to learn data sources usage patterns of other users similar to the service subscriber 116.

In one configuration, AI/ML prediction may be incorporated for both subscriber (as described above) and publisher (auto suggest to publish based on geolocation or time based notification to maximize incentives). For example, the server instructions may include instructions to train a machine learning model to determine recommended data sources based on historical sensor data from other publisher vehicles. The machine learning model may suggest, to a publisher vehicle 104, sharing video/camera data at a particular location and/or time period based on historical publisher patterns in sharing video/camera feed. After training operation 412, control passes to providing operation 414 (see FIG. 4B).

At providing operation 414, the server 106 provides the recommended data sources to the service subscriber 116. The machine learning model may learn user patterns of accessing sensor data. With time the machine learning model checks if sensor data from vehicles similar to the subscriber's vehicle are available and auto-suggests to the subscriber access to other sensor data. The server 106 may check if data sources from vehicles similar to the subscriber vehicle 118 are available and may recommend to the service subscriber 116 such data sources.

Consider, for example, a scenario where the service subscriber 116 often visits location X every Friday and Saturday nights and parks their subscriber vehicle 118 at a multilevel parking lot. The subscriber vehicle 118 is not equipped with connected cameras and the service subscriber 116 uses the server 106 to check the subscriber vehicle's surroundings at 11 PM before walking to the subscriber vehicle 118. With time the machine learning model can learn the service subscriber's patterns and auto suggests the service subscriber 116 view a camera feed when the subscriber vehicle 118 is parked at location Y on Tuesdays and Wednesdays at 8 PM. In another example a publisher vehicle is parked at location X every day from 9 AM to 5 PM and publishes video feed data. With time the system learns this pattern and auto suggests the owner to share his video feed at X between 9 AM to 5 PM.

In another scenario, several service subscribers may receive a video data stream from a particular vehicle sensor 108 when they are parked at location Y from 11 PM to 6 AM. If the service subscriber 116 is in location Y for the first time, the server 106 may recommend the same video data stream to the service subscriber 116. After providing operation 414, control passes to receiving operation 416.

At receiving operation 416, the server 106 receives a financial payment from the service subscriber 116. Subscriptions can be, for example, on a need basis (for a few days), weekly, monthly, or as part of a special weekend package. After receiving operation 416, control passes to providing operation 418.

At providing operation 418, the server 106 provides a financial incentive for transmission of vehicle sensor data by the publisher vehicle 104. For example, the publisher vehicle 104 may receive discounts, coupons, incentives for opting-in to the system 102.

Providing operation 414 may additionally or alternatively include recommending to the publisher vehicle sensor data to publish by providing the recommended sensor data for publication to the publisher vehicle 104. The machine learning model may learn user patterns of publishing sensor data and auto-suggest to the publisher sensor data to publish to maximize, for example, geolocation data coverage and/or time of day data coverage.

Figure 5:
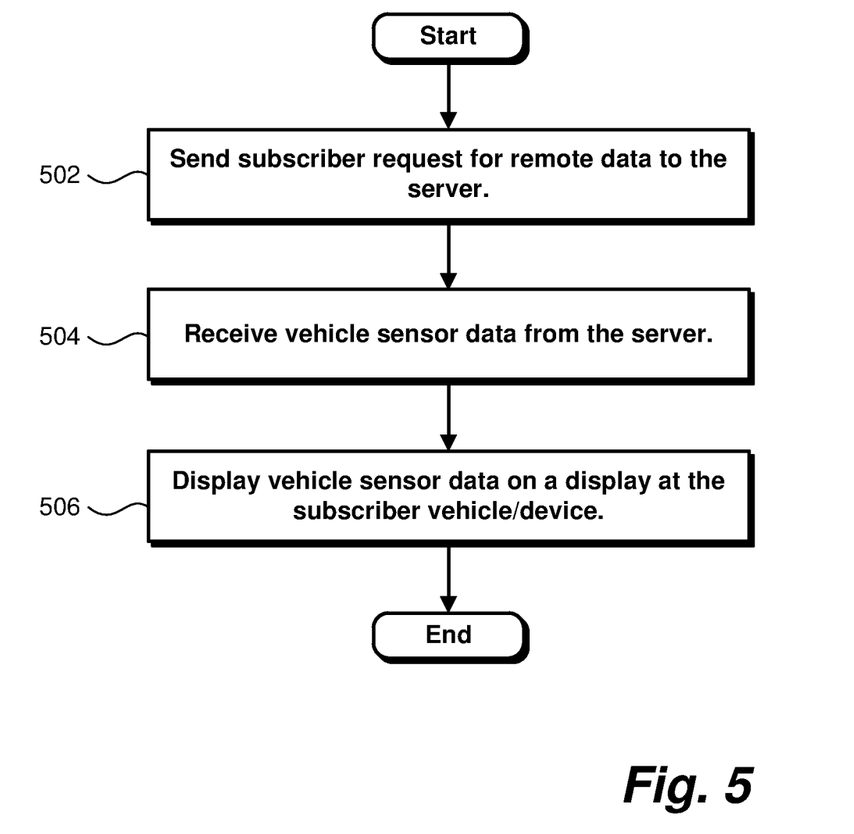
FIG. 5 shows an example method for sensor access performed by the subscriber device.

FIG. 5 shows an example method for sensor access performed by the service subscriber 116. As noted above, the service subscriber 116 may be a portable device, such as a smartphone or a computer carried by a subscriber vehicle 118.

The method may include a sending operation 502 that sends a subscriber request for remote data by the service subscriber 116 to the server 106. The request may include notification preferences, such as the duration, proximity, and specific times/days, the remote data is requested. It is contemplated that the server 106 may offer, for example, sensor data of traffic ahead of the subscriber vehicle 118 and unmanned aerial vehicle (drone) sensor data. After sending operation 502, control passes to receiving operation 504.

At receiving operation 504, the service subscriber 116 receives the vehicle sensor data from the server 106. The sensor data may be, for example, a live camera feed from a publisher vehicle 104. In one configuration, the server 106 issues push notifications for sensor data available at publisher vehicles 104 and/or publisher stations 110. Push notifications can be configured for a location, day, time window, and so on. After receiving operation 504, control passes to displaying operation 506.

At displaying operation 506, the vehicle sensor data is displayed at the service subscriber 116. In one configuration the sensor data is displayed a vehicle display 120 at the subscriber vehicle 118. For example, the vehicle display 120 may show available parking locations 114 within 200 meters of the subscriber vehicle 118.

The descriptions of the various examples and implementations have been presented for purposes of illustration but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical enhancements over technologies found in the marketplace, or to enable others of ordinary skill in the art to understand the implementations disclosed herein.

As will be appreciated, the methods and systems described may be implemented as a computer program product. The computer program product may include a computer readable storage medium (or media) having computer readable program instructions thereon for causing a processor to carry out operations discussed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry.

Various implementations are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a server including a server processor and a server memory, the server memory storing server instructions executable by the server processor to:
receive vehicle sensor data and a vehicle location associated with the vehicle sensor data from a publisher vehicle, the vehicle sensor data including a publisher data type;
receive, from a service subscriber, a subscriber request for remote data, the subscriber request including a request location and a subscriber data type;
determine whether there is a match condition, the match condition including a vehicle location match between the request location and the vehicle location as well as a type match between the publisher data type and the subscriber data type, the data type specifying a type of sensor or sensing medium of the data; and transmit the vehicle sensor data to the service subscriber upon occurrence of the match condition.

2. The system of claim 1, wherein the vehicle sensor data includes camera images of a physical area adjacent the vehicle location.

3. The system of claim 1, wherein the vehicle sensor data includes an indication of an available parking location adjacent the publisher vehicle.

4. The system of claim 1, further comprising:
wherein the vehicle sensor data includes a published data time;
wherein the subscriber request includes a request time period; and
wherein the match condition includes a time match between the request time period and the published data time.

5. The system of claim 1, further comprising:
wherein the vehicle sensor data includes a published data time;
wherein the server instructions include server instructions to receive an indication of an allowed time for the vehicle sensor data; and
wherein the match condition includes a time match between the allowed time and the published data time.

6. The system of claim 1, wherein the server instructions include server instructions to:
train a machine learning model to determine recommended data sources based on historical subscriber requests from the service subscriber; and
provide the recommended data sources to the service subscriber.

7. The system of claim 1, wherein the server instructions include server instructions to:
train a machine learning model to determine recommended data sources based on historical subscriber requests from a plurality of service subscribers; and
provide the recommended data sources to the service subscriber.

8. The system of claim 1, further comprising:
a subscriber device including a device processor and device memory, the device memory including device instructions executable by the device processor to:
send the subscriber request for the remote data to the server; and
receive the vehicle sensor data from the server.

9. The system of claim 8, wherein the subscriber device is a smartphone.

10. The system of claim 8, further comprising:
wherein the subscriber device is a computer carried by a subscriber vehicle; and
wherein the device instructions include instructions to display the vehicle sensor data on a vehicle display at the subscriber vehicle.

11. The system of claim 1, wherein the server instructions include server instructions to:
receive stationary sensor data associated with a stationary location; and
transmit the stationary sensor data to the service subscriber upon occurrence of the match condition, wherein the match condition includes stationary location match between the request location and the stationary location.

12. The system of claim 1, wherein the server instructions include server instructions to:

train a machine learning model to determine recommended data sources for publication based on historical sensor data from publisher vehicles; and
provide the recommended data sources for publication to the publisher vehicle.

13. A method comprising:
receiving vehicle sensor data and a vehicle location associated with the vehicle sensor data from a publisher vehicle, the vehicle sensor data including a publisher data type;
receiving, from a service subscriber, a subscriber request for remote data, the subscriber request including a request location and a subscriber data type;
determining whether there is a match condition, the match condition including a vehicle location match between the request location and the vehicle location as well as a type match between the publisher data type and the subscriber data type, the data type specifying a type of sensor or sensing medium of the data; and
transmitting the vehicle sensor data to the service subscriber upon occurrence of the match condition.

14. The method of claim 13, wherein the vehicle sensor data includes camera images of a physical area adjacent the vehicle location.

15. The method of claim 13, wherein the vehicle sensor data includes an indication of an available parking location adjacent the publisher vehicle.

16. The method of claim 13, further comprising:
wherein the vehicle sensor data includes a published data time;
wherein the subscriber request includes a request time period; and
wherein the match condition includes a time match between the request time period and the published data time.

17. A system comprising:
a server including a server processor and a server memory, the server memory storing server instructions executable by the server processor to:
receive vehicle sensor data and a vehicle location associated with the vehicle sensor data from a publisher vehicle;
receive, from a service subscriber, a subscriber request for remote data, the subscriber request including a request location;
receive an indication of an allowed region for the vehicle sensor data, the allowed region being an area defined by a set of locations where access to the sensor data is permitted;
determine whether there is a match condition, the match condition including a vehicle location match between the request location and the vehicle location and a region match between the vehicle location and the allowed region; and
transmit the vehicle sensor data to the service subscriber upon occurrence of the match condition.

18. The system of claim 17, wherein the vehicle sensor data includes camera images of a physical area adjacent the vehicle location.

19. The system of claim 17, further comprising:
wherein the vehicle sensor data includes a published data time;
wherein the subscriber request includes a request time period; and
wherein the match condition includes a time match between the request time period and the published data time.

20. The system of claim 17, further comprising:
wherein the vehicle sensor data includes a published data time;
wherein the server instructions include server instructions to receive an indication of an allowed time for the vehicle sensor data; and
wherein the match condition includes a time match between the allowed time and the published data time.

* * * * *